(12) United States Patent
Ince et al.

(10) Patent No.: US 11,105,370 B1
(45) Date of Patent: Aug. 31, 2021

(54) TWO-PIECE BEARING CAGE FOR HIGH-SPEED BEARINGS

(71) Applicant: SCHAEFFLER TECHNOLOGIES AG & CO. KG, Herzogenaurach (DE)

(72) Inventors: Marion Jack Ince, Mount Holly, NC (US); Guihui Zhong, Charlotte, NC (US); Michael Heaton, Rock Hill, SC (US); Dennis Roffe, Fort Mill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/801,850

(22) Filed: Feb. 26, 2020

(51) Int. Cl.
*F16C 33/38* (2006.01)
*F16C 19/06* (2006.01)

(52) U.S. Cl.
CPC .......... *F16C 33/3862* (2013.01); *F16C 19/06* (2013.01)

(58) Field of Classification Search
CPC .. F16C 19/06; F16C 33/3862; F16C 33/3875; F16C 2226/74; F16C 33/4641; F16C 33/4652

See application file for complete search history.

(56) References Cited

U.S. PATENT DOCUMENTS

2016/0215822 A1* 7/2016 Yasuda

FOREIGN PATENT DOCUMENTS

| DE | 3341980 | A | * | 6/1984 | |
|---|---|---|---|---|---|
| EP | 2743527 | A1 | | 6/2014 | |
| JP | 2007040383 | A | * | 2/2007 | |
| JP | 2014020468 | A | * | 2/2014 | .......... F16C 33/3875 |

OTHER PUBLICATIONS

Machine Translation of DE3341980A (Year: 1984).*
Machine Translation of JP-2007040383-A (Year: 2007).*

* cited by examiner

*Primary Examiner* — Alan B Waits
(74) *Attorney, Agent, or Firm* — Dickinson Wright PLLC

(57) ABSTRACT

A bearing cage includes a first annular body having a plurality of circumferentially arranged fingers that extending axially therefrom. Each of the fingers have a tab with a first arcuate engagement surface. A second annular body has a plurality of circumferentially arranged finger-receiving holes extending axially and configured to receive the fingers. Each of the holes have an associated second arcuate engagement surface configured to engage with the first arcuate engagement surface when the fingers are received in the holes to secure the first and second bodies together to form the bearing cage.

16 Claims, 6 Drawing Sheets

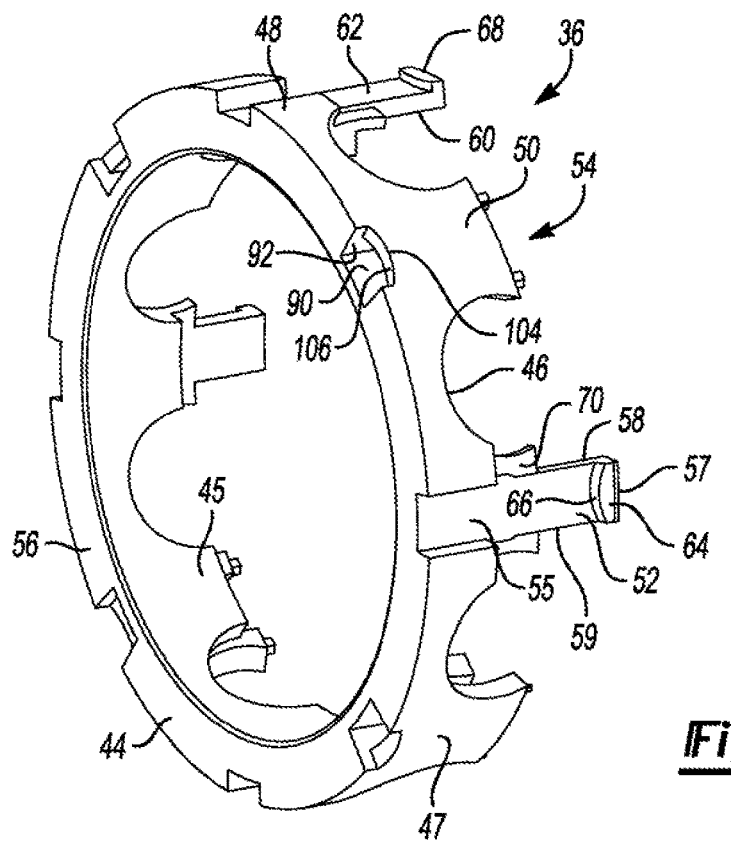
_Fig-2A_
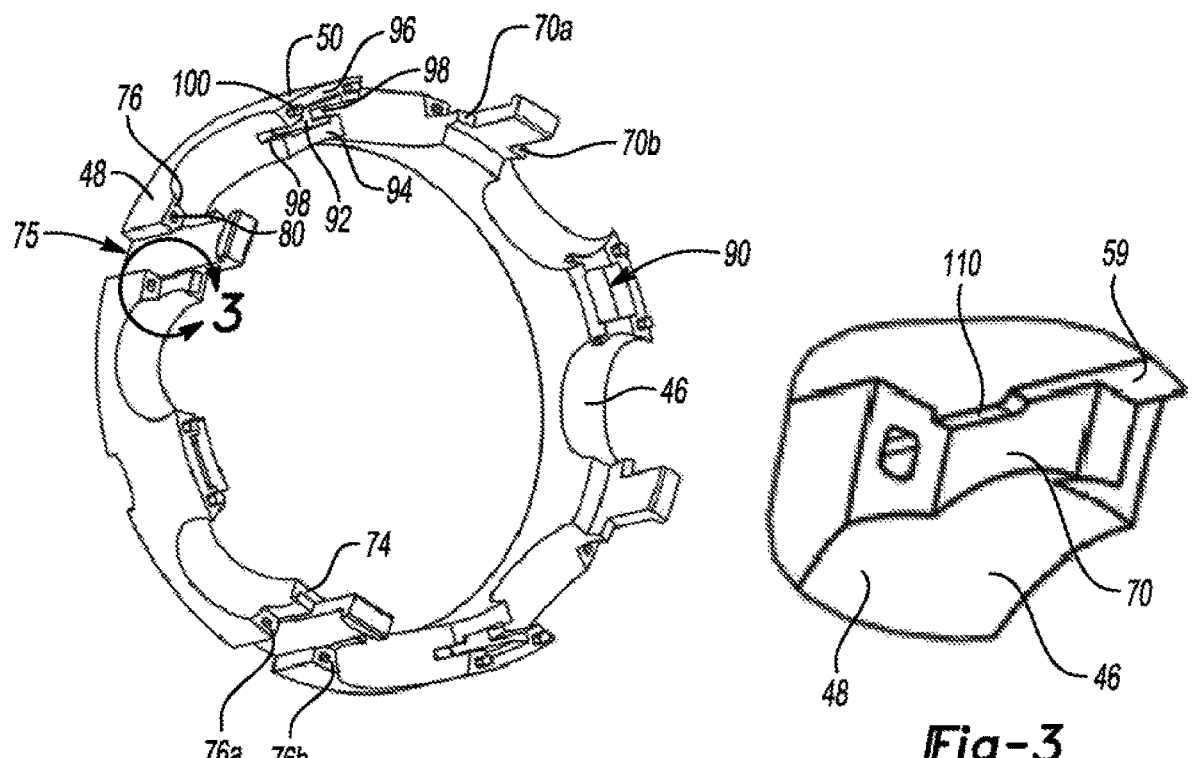
_Fig-2B_
_Fig-3_

TWO-PIECE BEARING CAGE FOR HIGH-SPEED BEARINGS

TECHNICAL FIELD

The present disclosure relates to high-speed bearings and more specifically to two-piece bearing cages for use in high-speed applications.

BACKGROUND

A bearing is one type of friction-reducing component. Many different types of bearings are used in a variety of applications. Rolling bearings are one type of bearing that are commonly used in automotive applications. A typical rolling bearing includes a first race, a second race, and a plurality of rolling elements disposed between the first and second races. The rolling elements may be spherical (commonly called ball bearings) or cylindrical (sometimes called needle bearings). The rolling elements act between the races to provide smooth, low friction rotation. A cage is sometimes used to hold the rolling elements in place to prevent contact and maintain spacing. The cage is disposed in the space defined between the races.

SUMMARY

According to one embodiment, a bearing cage includes a first annular body having a plurality of circumferentially arranged fingers that extending axially therefrom. Each of the fingers have a tab with a first arcuate engagement surface. A second annular body has a plurality of circumferentially arranged finger-receiving holes extending axially and configured to receive the fingers. Each of the holes have an associated second arcuate engagement surface configured to engage with the first arcuate engagement surface when the fingers are received in the holes to secure the first and second bodies together to form the bearing cage.

According to another embodiment, a bearing cage includes first and second annular bodies connectable to form the bearing cage. Each body includes a plurality of cutouts circumferentially arranged around a front side of the body and a plurality of fingers circumferentially arranged around the front side between associated ones of the cutouts and extending axially therefrom. Each of the fingers have a tab with a first arcuate engagement surface. Each body further includes a plurality of finger-receiving holes circumferentially arranged around the body between associated ones of the cutouts and extending axially from the front side to a back side of the body. Each of the holes have an associated second arcuate engagement surface recessed into the back side and configured to engage with the first arcuate engagement surface. When the bodies are connected, the fingers of the first body are disposed in the holes of the second body with the first and second arcuate engagement surfaces engaged, the fingers of the second body are disposed in the holes of the first body with the first and second arcuate engagement surfaces engaged, and the cutouts of the first and second bodies cooperate to form pockets configured to receive rolling elements therein.

According to yet another embodiment, a rolling bearing includes an inner race, an outer race, and a bearing cage radially disposed between the inner and outer races. The cage includes first and second annular bodies connectable to form the bearing cage. Each body has a plurality of cutouts circumferentially arranged around a front side of the body and a plurality of fingers circumferentially arranged around the front side between associated ones of the cutouts and extending axially therefrom. Each of the fingers have a tab with a first arcuate engagement surface. Each body further has a plurality of finger-receiving holes circumferentially arranged around the body between associated ones of the cutouts and extending axially from the front side to a back side of the body. Each of the holes have an associated second arcuate engagement surface recessed into the back side and configured to engage with the first arcuate engagement surface. When the bodies are connected, the fingers of the first body are disposed in the holes of the second body with the first and second arcuate engagement surfaces engaged, the fingers of the second body are disposed in the holes of the first body with the first and second arcuate engagement surfaces engaged, and the cutouts of the first and second bodies are aligned to form pockets configured to receive rolling elements therein. Rolling elements are received in the pockets and are in rolling contact with the inner and outer races.

BRIEF DESCRIPTION OF THE DRAWINGS

FIG. 2A is a back perspective view of a cage half of the rolling bearing.

FIG. 2B is a front perspective view of the cage half.

FIG. 3 is a detail view of a circumferential locating feature of the cage half.

DETAILED DESCRIPTION

Figure 1:
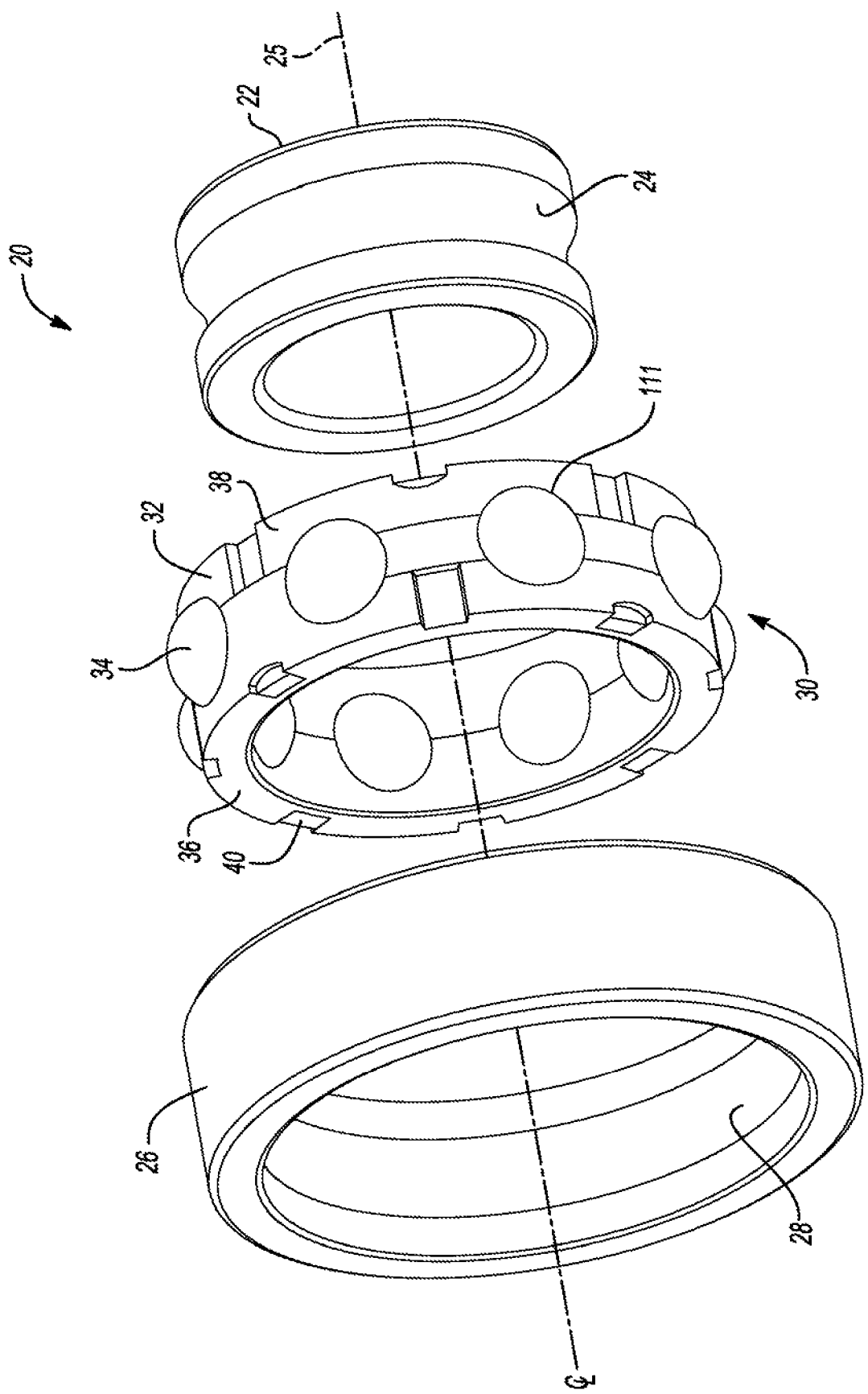
FIG. 1 is a partial exploded perspective view of a rolling bearing according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures.

A central axis (or centerline) is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

Referring to FIG. 1, a rolling bearing 20 includes an inner race 22 that defines a groove 24. An outer race 26 circumscribes the inner race 22 and also defines a groove 28. A cage assembly 30 is radially disposed between the inner and outer races. The cage assembly 30 includes a cage 32 supporting a plurality of rolling elements 34, such as ball bearings. The rolling elements 34 are partially received in the grooves 24 and 28 and are in rolling contact with the inner and outer races 22, 26. The grooves are an optional feature may not be provided in some embodiments. The inner race 22, the outer race 26, and the cage assembly 30 may be concentric with a centerline 25 of the bearing 20.

The cage 32 may include a pair of first and second cage halves 36, 38 that are secured together by retaining features 40. The cage assembly 30 may be formed by inserting the rolling elements 34 in one of the cage halves and then connecting the cage halves together. The first and second cage halves 36, 38 may be identical, i.e., a same component, or maybe two distinct components. While referred to as halves, the two mating cage components 36, 38 do not have to be an actual half of the cage, particularly if the components 36, 38 are two different components. The cage 32 may be formed of plastic, such as polyamide 46, or other suitable material. The cage halves 36, 38 may be formed by injection molding or other suitable process depending upon the material type chosen.

Referring to FIGS. 2A and 2B, the first cage half 36 is shown from two different perspectives. In this embodiment, the first and second cage halves are a same component. Each of the cage halves 36, 38 may have an annular body 44 with an inner diameter 45, an outer diameter 47, a front side 54, and a back side 56. A plurality of bearing-receiving cutouts 46 are formed on the front side 54. The cutouts 46 are shaped and sized to correspond with the rolling elements, e.g., the rolling elements 34. In the illustrated embodiment, the cutouts 46 are semi-circles having a diameter that substantially matches the diameter of the spherical rolling elements 34. The cutouts 46 may have a slightly larger diameter to provide clearance for the rolling elements 34. The cutouts 46 are circumferentially arranged around the annular body 44 and extend radially from the inner diameter 45 to the outer diameter 47, i.e. the cutouts 46 are completely through the thickness of the annular body 44. The number of cutouts 46 corresponds to the number of balls at a 1:1 ratio. The cutouts 46 may have equidistant spacing. In the illustrated example of eight rolling elements 34, the eight cutouts 46 are spaced 45 degrees apart.

Between adjacent the cutouts 46 is either a first shoulder 48 or a second shoulder 50. The first and second shoulders 48, 50 alternate circumferentially around the annular body 44. The number of first shoulders 48 is equal to the number of second shoulders 50. The total number of shoulders may be equal to the number of cutouts 46. In the illustrated embodiment, the annular body 44 includes four first shoulders 48 and four second shoulders 50. The first shoulders 48 are designed to connect with the second shoulders 50 to secure the cage halves 36, 38 together. That is, the first shoulders 48 of the first cage half 36 connect with the second shoulders 50 of the second cage half 38 and vice versa.

Each of the first shoulders 48 may include a finger 52 extending axially from the front side 54. The finger 52 includes a proximal end 55 joined to the shoulder 48, a distal end 57, opposing sides 58, 59 extending from the proximal end 55 to the distal and 56, an inner face 60 extending from the proximal end 55 to the distal end 57, and an outer face 62 extending from the proximal end 55 to the distal end 57. A tab 64 is formed near the distal end 57 and is raised from the outer face 62. The tab 64 may include an arcuate engagement surface 66 that faces the proximal end 55. The arcuate engagement surface 66 may extend circumferentially between the opposing sides 58, 59, and extend radially from the outer face 62 to a top surface 68 of the tab 64. The arcuate engagement surface 66, in the illustrated embodiment, is convex, i.e., bowing outwardly towards the proximal end 55, so that the tab 64 is axially thickest in the middle and thinner at the edges. In other embodiments, the arcuate surface 66 may be concave. In one or more embodiments, the finger 52 may include one or more associated wings 70. In the illustrated embodiment, each finger 52 includes a pair of wings 70a and 70b. The wings 70 are located on the opposing sides 58, 59 of the finger 52. For example, the wing 70a projects from the side 59 and the wing 70b projects from the side 58.

Each of the first shoulders 48 may also include an outer mating face 76 and an inner mating face 74. The inner and outer mating faces 74, 76 are separated by the finger 52 and the wings 70. The inner mating face 74 may be axially forward of the outer mating face 76. The outer mating face 76 may be a single continuous face (not shown) or may be pair of circumferentially spaced faces 74, 76 (as shown). In the illustrated embodiment, outer slots 75 are formed in the outer diameter 47 near the first shoulders 48 thus forming the pair of mating faces 76. In other embodiments, the slots 75 are omitted and the mating face 76 is a single continuous face. The slots 75 may be provided to ease manufacturing of the fingers 52. The outer mating face 76 may define one or more pin holes 80. In the illustrated embodiment, each of the outer mating faces 76a and 76b defines a pin hole 80.

Each of the second shoulders 50 may include a finger-receiving hole 90 extending axially from the front side 54 to the back side 56 of the annular body 44, i.e., completely through the body 44. Each hole 90 is configured to receive one of the fingers 52. The holes 90 may be generally centered on the second shoulders 50. Each second shoulder 50 may also include an inner mating face 94 and an outer mating face 96. The outer mating face 96 may be located axially forward of the inner mating face 94. One or more pins 100, e.g., a pair of pins, project from the outer mating face 96. The pins 100 are configured to be received within the pin holes 80. Wing slots 98 are formed on the on the sidewalls 92 of the holes 90. The wing slots 98 are configured to receive the wings 70 therein.

Each hole 90 has an associated tab catch 104 formed on the back side 56 of the body 44. The tab catches 104 are configured to engage with the tabs 64 to form a click-fit and resist separation of the first and second halves 36, 38. The tab catches 104 may be recessed into the back side 56 and are located near the outer diameter 47. Each of the tab catches 104 defines an arcuate engagement surface 106 configured to mate with an arcuate engagement surface 66 of an associated tab 64. The arcuate engagement surface 106, in the illustrated embodiment, is concave, which is opposite of the convex engagement surface 66. The arcuate engagement surface 106 may extend between the sidewalls 92 of the hole 90. The arcuate engagement surface 106 is concave in the axial direction so that the midpoint of the arcuate surface 106 is more recessed into the back side 56 than the ends of the surface 106. The radii of the arcuate surfaces 106 may be equal to the radii of the arcuate segments 66 to create even contact therebetween. In other embodiments, the arcuate engagement surface 106 may be convex when the arcuate engagement surface 66 is concave.

The inner mating faces 74 are configured to engage with the inner mating faces 94, and the outer mating faces 76 are configured to engage with the outer mating faces 96. In the illustrated embodiment, the mating faces are all oriented radially, i.e. they are flat. (As will be described below, the mating faces can be slanted in other embodiments.) The outer mating faces 76 are recessed compared to the inner mating faces 74. That is, a first distance between the back side 56 and the outer mating face 76 is less than a second distance between the back side 56 and the inner mating face 74. The inner and outer mating faces 94, 96 of the second shoulders 50 are the opposite. A third distance between the back side 56 and the outer mating face 96 is greater than a fourth distance between the back side 56 and the inner mating face 94. The first distance plus the third distance may be equal to the axial thickness of the cage 32, and the second distance plus the fourth distance may be equal to the axial thickness of the cage 32, for example.

Referring to FIG. 3, the first shoulders 48 may include one or more circumferential locating features 110. The circumferential locating features 110 are raised relative to the opposing side 58 or 59, respectively. The features 110 are configured to engage with the sidewalls 92 of the holes 90 and prevent circumferential movement between the cage halves 36, 38. The sidewalls 92 of the holes 90 may be wider than the fingers 52 to create clearance for insertion of the tabs 64. The circumferential locating features 110 take up this clearance creating a snug fit.

Figure 4:
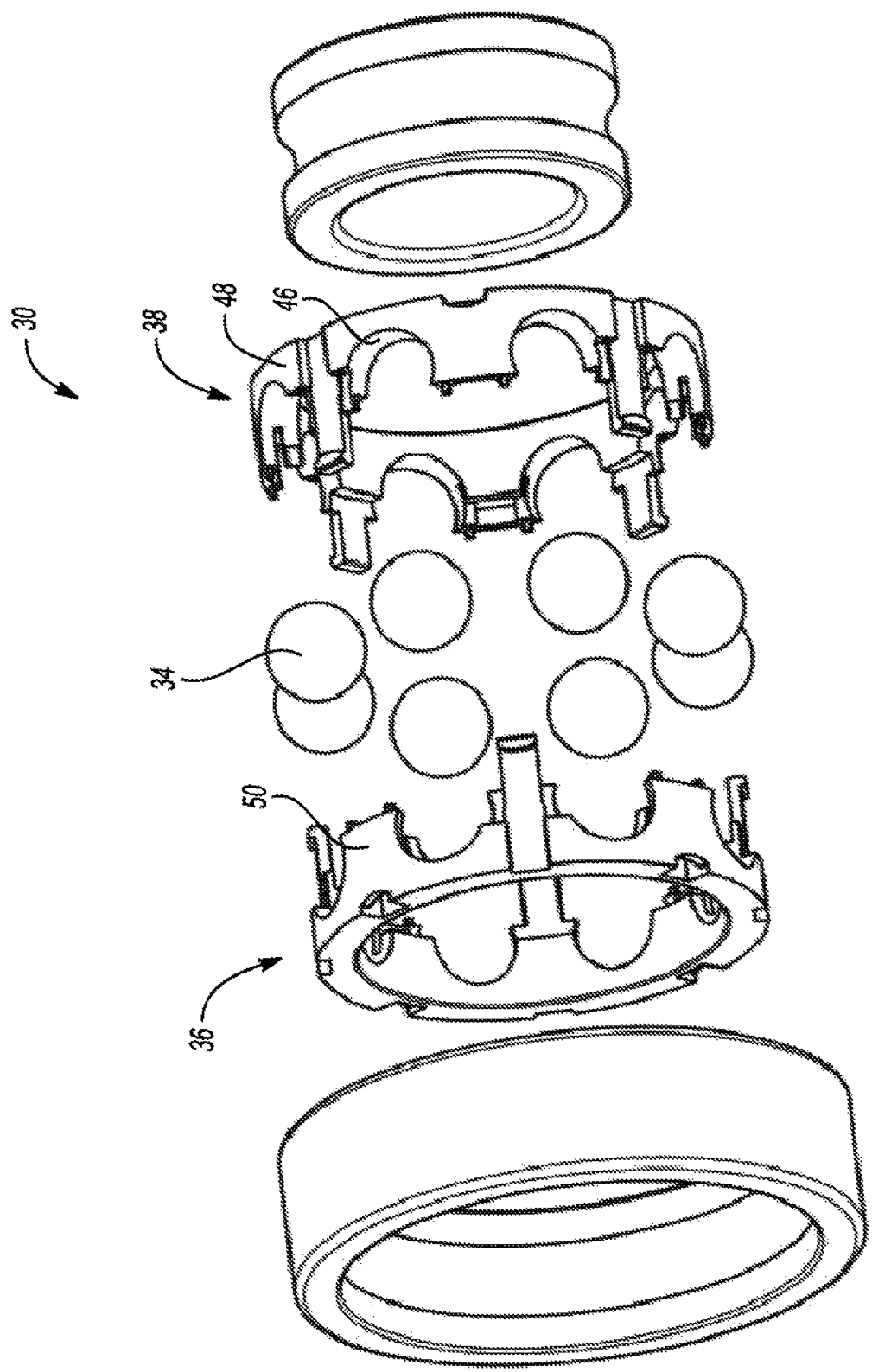
FIG. 4 is an exploded perspective view of the rolling bearing.

Referring to FIGS. 2A, 2B, and 4, the cage assembly 30 may be assembled by placing the rolling elements 34 in the cutouts 46 of one of the cage halves 36, 38 and aligning them so that the first shoulders 48 of the cage half 36 are opposite the second shoulders 50 of the cage half 38. The cage halves 36, 38 are connected by inserting the fingers 52 into the holes 90, moving the cage halves 36, 38 towards each other until the inner mating faces 74 seat against the inner mating faces 94, the outer mating faces 76 seat against the inner mating faces 96, and the tabs 64 click-fit with the tab catches 104. When connected, the arcuate engagement surfaces 66 are disposed against the arcuate engagement surfaces 106, the pins 100 are disposed in the pin-receiving holes 80, and the wings 70 are disposed in the wing slots 98. The cutouts 46 cooperate to form pockets 111 (see FIG. 1) that support the rolling elements 34. To reduce axial play, the axial distance between the arcuate engagement surface 66 and the outer engagement surface 76 may be substantially equal to the axial distance between the arcuate engagement surface 106 and the outer engagement surface %.

The tabs 64 and the tab catches 104 cooperate to retain the cage halves together. Making the engagement surfaces 66 and 106 arcuate creates more uniform load distribution along the surfaces as compared to a straight surface. This allows the cage assembly 30 to accommodate greater loads without breaking. In practice, this allows the cage assembly 30 to be used in higher-speed bearings. The various features of the bearing 20 provide a robust connection between the cage halves 36, 38 and allows the bearing cage 32 to be used in very high-speed environments, such as up to 50,000 RPMs.

While the cage 32 of the illustrated embodiment is formed of two same cage halves, this need not be the case. The cage 32 may be formed of two different cage halves. For example, one of the cage halves (first half) may include all of the fingers whereas the other half (second half) includes of the finger-receiving holes and the tab catches. Here, the first half may only include first shoulders 48 and the second half may only include the second shoulders 50.

Figure 5:
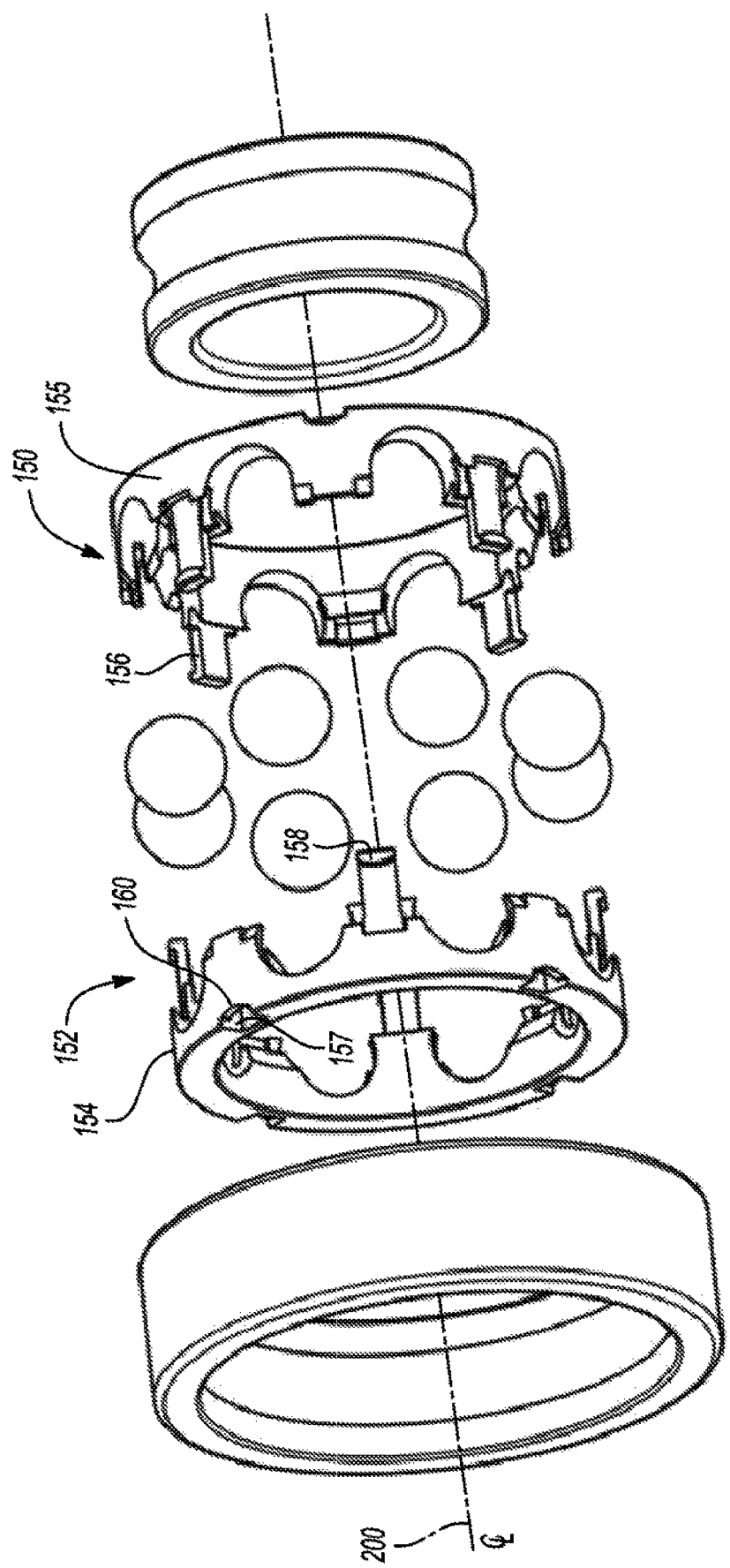
FIG. 5 is an exploded perspective view of another rolling bearing according to an alternative embodiment.
Figure 6A:
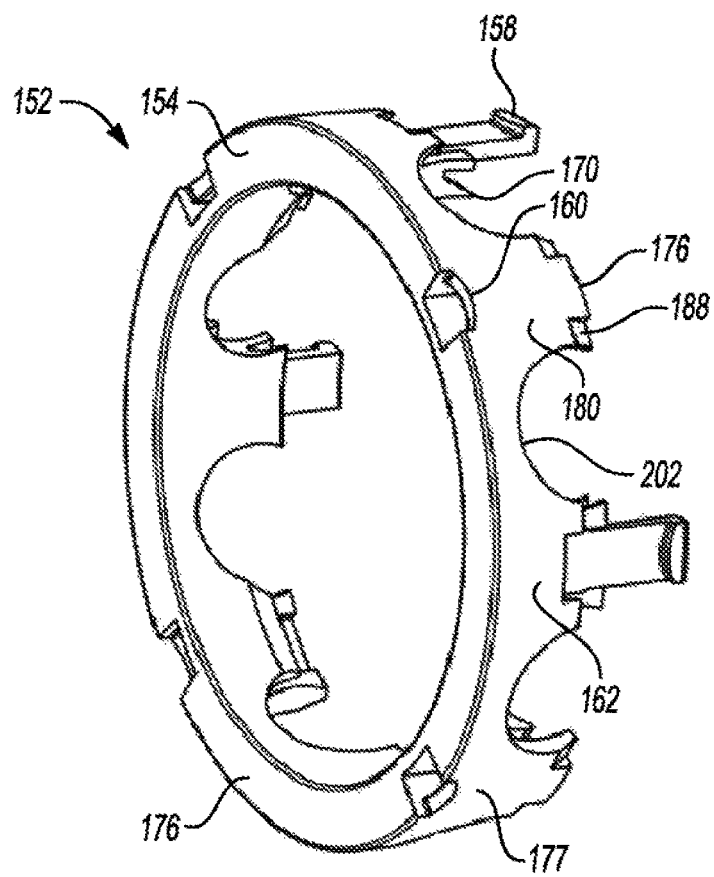
FIG. 6A is a back perspective view of a cage half of the another rolling bearing.
Figure 6B:
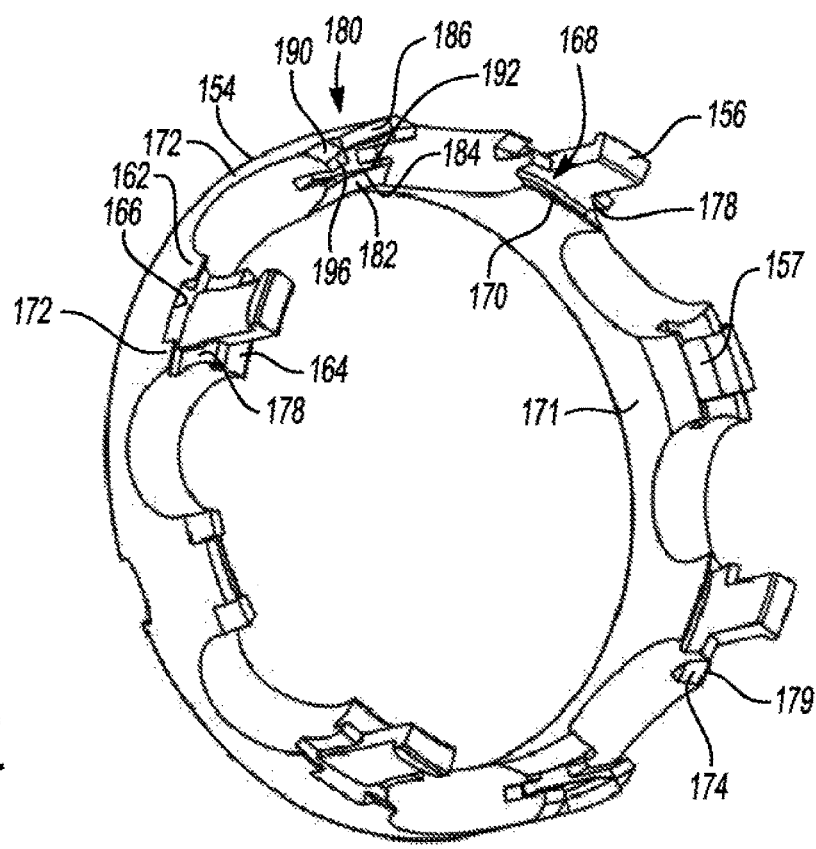
FIG. 6B is a front perspective view of the cage half of the another rolling bearing.

Referring to FIGS. 5, 6A and 6B, another high-speed rolling bearing 150 includes a cage 152 that is similar to the above-described cage 32. The cage 152 includes a first cage half 154 and a second cage 155 that are connected together using the fingers 156, holes 157, tabs 158, and tab catches 160 as explained above. The first and second halves may be a same component or different components as described above. One difference is that the bearing 150 has angled features in lieu of the above described pin and pin-receiving holes.

Each of the first shoulders 162 may include an inner mating face 164 and at least one outer mating face 166. The inner mating face 164 is slanted at an oblique angle relative to the centerline 200 of the bearing forming an arcuate edge 170 at the inner diameter 171 of the annular body 176. The inner mating face 164 cooperates with the finger 156 and its associated wings 178 to define a circumferential groove 168. The outer mating face 166 be flat and oriented radially. The face 166 may have an associated pair of spaced apart projections 172 located on opposing sides of the shoulder 162. Each of the projections 172 may include an angled face 174 that is slanted outwardly to form an arcuate edge 179 at the outer diameter 177 of the annular body 176.

Each of the second shoulders 180 may include an inner mating face 182 that angles outwardly from the inner diameter 171 of the body 176 to a sidewall 192 of the hole 157 forming an arcuate edge 184. The inner mating face 182 is angled to match the angle of the inner mating face 164 so that they overlap in contact when the cage 152 is assembly. The angles of the faces 164 and 182 may be supplementary. Each second shoulder 180 may also include an outer mating face 186. The outer mating face 186 may be fat and oriented radially to match the outer mating face 166. A pair of receptacles 188 flank the outer mating face 186 and are configured to receive the projections 172. Each of the receptacles 188 may include an angled face 190 that is configured to engage with the angled face 174. The angles of the faces 190 and 174 may be supplementary. Flat ends 196 may be formed at the entrances of the receptacles 188. The flat ends 196 are oriented radially and may have a same axial location as the outer mating face 186, i.e., the ends 196 may be coplanar with the face 186. The flat ends 196 are configured to engage with the outer mating surface 166.

The cage 152 may be assembled by placing the rolling elements 34 in cutouts 202 of one of the cage halves 154, 155 and aligning them so that the first shoulders 162 are opposite the second shoulders 180. The cage halves 154, 155 are connected by inserting the fingers 156 into the holes 157, moving the cage halves 154, 155 towards each other until the inner mating faces 182 seat within the grooves 168, the outer mating faces 166 seat against the outer mating faces 186 with the projections 172 received in the receptacles 188, and the tabs 158 click-fit with the tab catches 160. The tabs 158 and the tab catchers 160 cooperate to retain the cage halves together as discussed above.

Figure 7A:
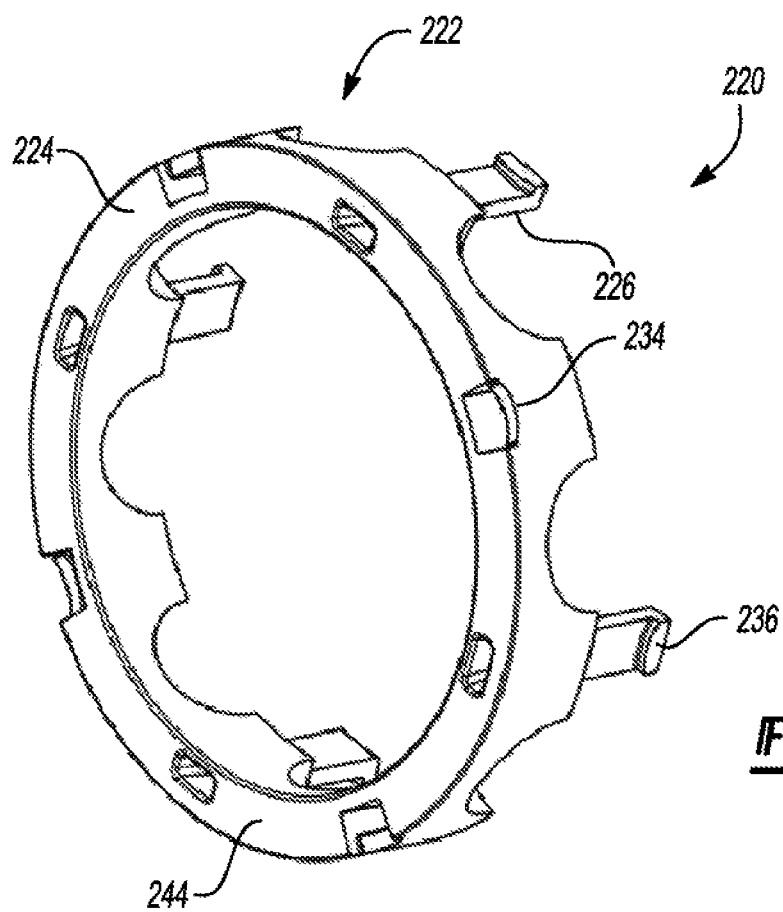
FIG. 7A is a back perspective view of a cage half of yet another rolling bearing according to a second alternative embodiment.
Figure 7B:
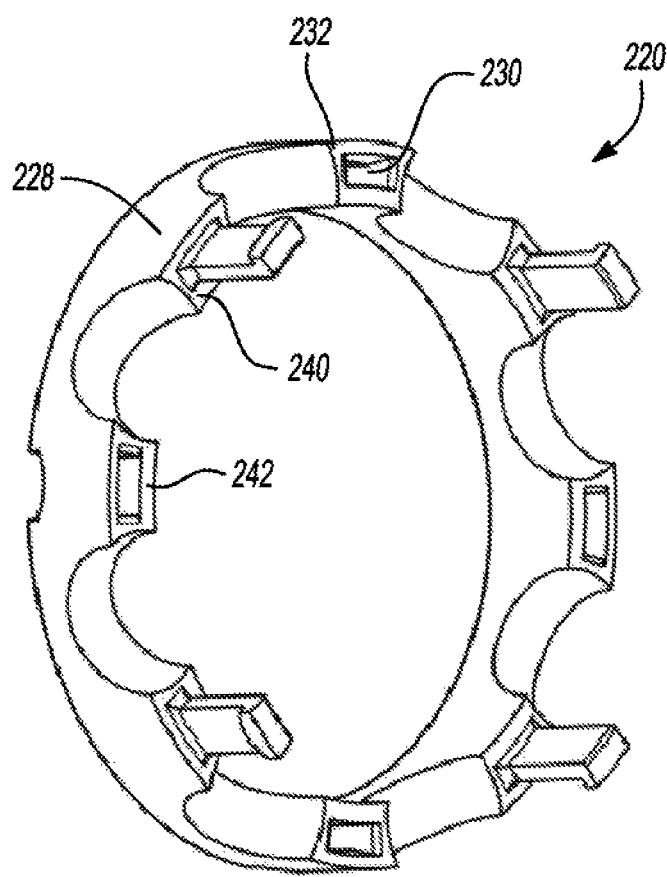
FIG. 7B is a front perspective view of the cage half of the yet another rolling bearing.

FIGS. 7A and 7B illustrates yet another embodiment of a high-speed rolling bearing 220. The bearing 220 includes a cage formed of a pair of cage halves. The cage halves may be two of a same component or may each be a different component. An example cage half 222 includes an annular body 224 having a plurality of fingers 226 extending from first shoulders 228. The fingers 226 are insertable through a plurality of finger-receiving holes 230 that extend through second shoulders 232. The holes 230 are oriented axially and extend completely through a thickness of the annular body 224. Each hole 230 has an associated tab catcher 234. The tab catchers 234 engage with tabs 236 of the fingers 226 to retain the cage together. The design of the tabs 236 and the tab catchers 234 may be as described above. One difference in the embodiment of FIGS. 7A and 7B is that the engagement surfaces 240 and 242 are located at a same axial distance from a back side 244 of the body 224 and are radially oriented. The cage halves of the bearing 220 are connected together as described above to form the cage assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST bearing 20
inner race 22
outer races 22
groove 24
centerline 25
outer race 26
groove 28
cage assembly 30
cage 32
rolling elements 34
cage half 36
cage halve 38
features 40
body 44
inner diameter 45
cutouts 46
outer diameter 47
first shoulders 48
second shoulder 50
fingers 52
front side 54
proximal end 55
back side 56
distal end 57
side 58
side 59
inner face 60
outer face 62
tabs 64
arcuate engagement surface 66
top surface 68
wings 70
inner mating faces 74
slots 75
outer mating faces 76
holes 80
holes 90
sidewalls 92
inner mating faces 94
outer mating faces 96
wing slots 98
pins 100
tab catches 104
arcuate engagement surfaces 106
circumferential locating features 110
features 110
pockets 111
rolling bearing 150
cage 152
first cage half 154
second cage half 155
fingers 156
holes 157
tabs 158
tab catchers 160
first shoulders 162
inner mating face 164
outer mating face 166
grooves 168
arcuate edge 170
inner diameter 171
projections 172
angled face 174
annular body 176
outer diameter 177
wings 178
arcuate edge 179
second shoulder 180
inner mating faces 182
arcuate edge 184
outer mating faces 186
receptacles 188
faces 190
sidewall 192
flat ends 196
centerline 200
cutouts 202
bearing 220
cage half 222
body 224
fingers 226
first shoulders 228
holes 230 second shoulders 232
tab catchers 234
tabs 236
engagement surfaces 240
back side 244

What is claimed is:

1. A bearing cage comprising:
first and second annular bodies connectable to form the bearing cage, each body including:
a plurality of cutouts circumferentially arranged around a front side of the body,
a plurality of rectangular fingers circumferentially arranged around the front side between associated ones of the cutouts and extending axially therefrom, each of the fingers having a first planar face with a tab raised therefrom, the tab defining a first arcuate engagement surface such that the tab is axially thickest at a circumferential midpoint of the first engagement surface, and
a plurality of finger-receiving holes having rectangular cross-sections, the holes being circumferentially arranged around the body between associated ones of the cutouts and extending axially from the front side to a back side of the body, each of the holes having an associated second arcuate engagement surface recessed into the back side and configured to engage with the first engagement surface; wherein
the fingers of the first body are disposed in the holes of the second body with the first and second arcuate engagement surfaces engaged, the fingers of the second body are disposed in the holes of the first body with the first and second engagement surfaces engaged, and the cutouts of the first and second bodies cooperate to form pockets configured to receive rolling elements therein.

2. The bearing cage of claim 1, wherein the first arcuate engagement surface is convex, and the second arcuate engagement surface is concave.

3. The bearing cage of claim 1, wherein each of the rectangular fingers further has a proximal end joined to the body, a distal end, opposing planar sides extending between the proximal and distal ends, and a second planar face extending between the proximal and distal ends and spanning between the opposing sides, wherein the first planar face is opposite the second planar face, extends between the proximal and distal ends, and spans between the opposing sides, and wherein the tabs are formed on the distal ends.

4. The bearing cage of claim 3, wherein, for each of the fingers, the first engagement surface faces the proximal end, extends circumferentially between the opposing sides, and extends radially from the first planar face to a top surface of the tab, and wherein each of the finger-receiving holes includes opposing planar sidewalls, and each of the second engagement surfaces extends circumferentially between the opposing sidewalls of an associated one of the holes.

5. The bearing cage of claim 1, wherein each of the rectangular fingers further has a proximal end joined to the body, a distal end, opposing planar sides extending between the proximal and distal ends, and a second planar face extending between the proximal and distal ends and spanning between the opposing sides, wherein the first planar face is opposite the second planar face, extends between the proximal and distal ends, and spans between the opposing sides, and wherein the tabs are formed on the distal ends, and each of the first arcuate engagement surfaces extends circumferentially between the opposing sides of a corresponding one of the fingers.

6. The bearing cage of claim 1, wherein the first and second arcuate engagement surfaces have a same radius.

7. The bearing cage of claim 1, wherein each of the fingers has a wing, and each of the finger-receiving holes has a wing-receiving slot.

8. The bearing cage of claim 1, wherein each of the bodies further includes a plurality of shoulders circumferentially arranged around the front side of the body such that the shoulders and the cutouts alternate around a circumference of the front side, wherein the shoulders include a first set of shoulders that define the holes and a second set of shoulders that support the fingers.

9. The bearing cage of claim 8, wherein the first set of shoulders have pins, and the second set of shoulders define holes that receive the pins therein when the first and second bodies are connected together.

10. The bearing cage of claim 8, wherein the first set of shoulders have a first outer mating face that is axially forward of the back side by a first distance, and the second set of shoulders have a second outer mating face that is axially forward of the back side by a second distance that is less than the first distance, wherein the first and second outer mating faces engage when the first and second bodies are connected together.

11. The bearing cage of claim 10, wherein the first distance plus the second distance is equal to an axial thickness of the bearing cage.

12. The bearing cage of claim 10, wherein the first set of shoulders have a first inner mating face that is axially forward of the back side by third distance, and the second set of shoulders have a second inner mating face that is axially forward of the back side by a fourth distance that is greater than the third distance, wherein the first and second inner mating faces engage when the first and second bodies are connected together.

13. The bearing cage of claim 12, wherein the third distance plus the fourth distance is equal to an axial thickness of the barring cage.

14. The bearing cage of claim 12, wherein the first distance and the fourth distance are equal, and the second distance and the third distance are equal.

15. A rolling bearing comprising:
an inner race;
an outer race;
a bearing cage radially disposed between the inner and outer races, the cage including first and second annular bodies connectable to form the bearing cage, each body including:
a plurality of cutouts circumferentially arranged around a front side of the body,
a plurality of rectangular fingers circumferentially arranged around the front side between associated ones of the cutouts and extending axially therefrom, each of the fingers having a first planar face with a tab raised therefrom, the tab defining a first arcuate engagement surface such that the tab is axially thickest as at a mid-point of the engagement surface, and
a plurality of finger-receiving holes having rectangular cross-sections, the holes being circumferentially arranged around the body between associated ones of the cutouts and extending axially from the front side to a back side of the body, each of the holes having an associated second arcuate engagement surface recessed into the back side and configured to engage with the first arcuate engagement surface, wherein the fingers of the first body are disposed in the holes of the second body with the first and second arcuate engagement surfaces engaged, the fingers of the second body are disposed in the holes of the first body with the first and second arcuate engagement surfaces engaged, and the cutouts of the first and second bodies are aligned to form pockets configured to receive rolling elements therein; and rolling elements received in the pockets and in rolling contact with the inner and outer races.

16. The bearing of claim 15, wherein the first arcuate engagement surface is convex, and the second arcuate engagement surface is concave.

* * * * *